United States Patent Office

2,947,761
Patented Aug. 2, 1960

2,947,761

EPOXIDATION OF ALDEHYDES

George B. Payne, Kensington, Calif., assignor to Shell Oil Company, a corporation of Delaware No Drawing. Filed June 2, 1958, Ser. No. 738,943

13 Claims. (Cl. 260—348.5)

This invention relates to the production of epoxyaldehydes. It deals with a new method whereby alpha,beta-ethylenic aldehydes can be successfully epoxidized by reaction with hydrogen peroxide, and especially with the production of valuable alpha,beta-epoxypropionaldehydes in this way and with a new and commercially advantageous combination process using this method of reaction in the production of glycerols.

Alpha,beta-ethylenic aldehydes have been reacted with hydrogen peroxide under a variety of conditions but the products of the reaction as heretofore carried out have been only acid compounds and/or polymers except in the method of Smith and Holm's patent—U.S. 2,718,529. This patent describes and claims an effective method for avoiding acid and polymer formation in the reaction of olefinic aldehydes with peroxides by use of osmium tetroxide as catalyst and control of the rate of peroxide addition. However, not only is the catalyst expensive but the products obtained by this method are polyhydroxyaldehydes and not the more desirable epoxypropionaldehydes of the present invention. Insofar as can be determined from the published literature no one has heretofore successfully epoxidized ethylenic aldehydes of any kind and the new process of the invention makes available for the first time a valuable new class of alpha,beta-epoxypropionaldehydes.

It has been discovered that alpha,methylidene alkanals can be epoxidized successfully to produce the corresponding alpha,beta-epoxypropionaldehydes by reaction with hydrogen peroxide in the presence of an added basic agent. This is quite unexpected in view of the well known tendency of aldehydes in general and alpha-methylidene alkanals in particular to undergo condensation and polymerization reactions in the presence of basic agents and to oxidize readily to carboxylic acids in the presence of peroxides, especially as any carboxylic acid formation would be expected to make it impossible to produce epoxy products in appreciable yield because of known rapid reactivity of epoxy groups with acids. It was surprising therefore to find that by adding sufficient basic agent to the reaction mixture to maintain the pH in the range of about 4 to 12, these undesirable reactions can be substantially suppressed and alpha,beta-epoxypropionaldehydes obtained as primary products which, under the more advantageous reaction conditions, are produced in yields of the order of 90% or better. The reaction proceeds readily in accordance with the equation:

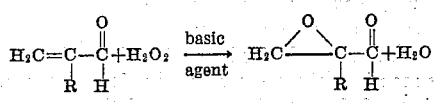

where

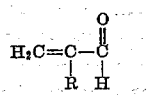

is the alpha-methylidene alkanal being epoxidized. The results are in accord with a mechanism of reaction in which hydrogen peroxide dissociates to form hydroperoxy ion ($^-$OOH) which attacks the beta carbon atom of the alpha-methylidene alkanal, and can be represented by the following equations:

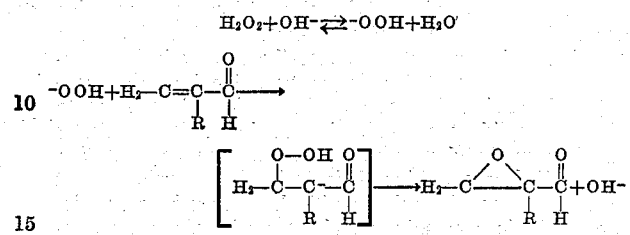

It has been found that there is always a consumption of OH$^-$ and it is necessary to carry out the reaction with added basic agent in order to maintain the reaction and achieve practical yields of alpha,beta-epoxypropionaldehydes.

Either organic or inorganic basic agents can be used to promote the reaction, it being only necessary that the added basic agent maintain the required pH of about 4 to 12 as previously indicated. Basic agents which are soluble in the reaction mixture are especially advantageous. Because of their availability and low cost, basic inorganic compounds are generally more advantageous. Suitable bases of this kind are inorganic hydroxides, examples of which are the alkali and alkaline earth hydroxides such as sodium hydroxide, potassium hydroxide, ammonium hydroxide, magnesium hydroxide, calcium hydroxide, etc.; the corresponding oxides, for instance, sodium oxide, calcium or magnesium oxide and the like; and basic salts such as the water-soluble carbonates, bicarbonates, phosphates and the like, such, for instance, as sodium carbonate or bicarbonate, tripotassium phosphate, etc. Among the organic bases which can be used, although generally they are less to be preferred because of their higher cost, are, for instance, amines such as mono-, di- or trimethylamine, the corresponding ethyl and isopropyl amines, and the like, salts of phenols such as potassium and calcium phenates, sodium meta-methyl phenoxide, sodium naphthoxide, etc. There are operating advantages sometimes in using an insoluble form of basic compound. Anion exchange resins, especially amine or quaternary ammonium base resins, are a particularly convenient form of insoluble base for use in the new process. Examples of suitable base resins are, for instance, the amination products of chloromethylated styrene-divinylbenzene copolymers described in U.S. 2,591,573 and sold by Rohm and Haas as "Amberlite IRA–400" and "IRA–401;" resins made by process of U.S. 2,388,235 and those sold by Dow Chemical Company as "Dowex 1;" anion resins such as "Triton-B," and the like. These may be used in the free base form or in the form of the salts, for instance, the carbonate salts of the strong base resins.

It has been found that the rate of reaction increases as the pH of the mixture is increased. A pH of at least about 4 is necessary in order to avoid slow reaction and usually it is advantageous to maintain a pH of at least 5.5 and more advantageously at least 6.5 in the reaction mixture throughout the reaction. The amount of by-products, mainly carboxylic acids, which are formed tend to increase as the pH is raised above about 9 and it is generally desirable to operate at a pH not greater than about 12 and more preferably at not above 10. Excellent results have been obtained by controlling the addition of basic agent so as to maintain the pH in the range of about 6.5 to about 8.5. In this range acid by-product formation is minimized. This is desirable not only for optimum yields but also to reduce consumption of basic agent and to minimize contamination of the product with bases and their salts.

The alpha-methylidene alkanal and hydrogen peroxide can be used in a wide range of proportions. It has been found that the rate of oxidation of epoxypropionaldehyde product is relatively slow compared with the rate of oxidation of the starting alpha-methylidene alkanal. But since such oxidation is favored by large amounts of excess peroxide it is generally desirable to use a total of not more than about 1.5 moles of hydrogen peroxide per mole of starting alpha-methylidene alkanal for the reaction. Because it is generally impractical to recover excess unreacted hydrogen peroxide from the product, it is preferred to use smaller ratios of peroxide to alpha-methylidene alkanal. Due to the marked tendency of alpha-methylidene alkanals to undergo condensation under alkaline conditions it is desirable to avoid contact of the unsaturated aldehyde with the chosen base or mixture of basic agents in the absence of hydrogen peroxide. To this end it is usually advantageous to maintain a free hydrogen peroxide present in the reaction mixture when operating at a pH above 7 and to use an excess of hydrogen peroxide over the stoichiometric requirement for the reaction under such conditions. Excellent results have been obtained with mole ratios of hydrogen peroxide to alpha-methylidene alkanal of about 1.02:1 to 1.2:1. When maintaining a pH below about 7 it is usually advantageous to use a stoichiometric excess of alpha-methylidene alkanal to hydrogen peroxide in the reaction since the excess can be recovered and recycled. Efficient conversion of hydrogen peroxide to alpha,beta-epoxypropionaldehyde is obtained in this way. Ratios of hydrogen peroxide to alpha-methylidene alkanal of at least about 0.5:1 are preferred and ratios between about 0.8:1 and about 1:1 are usually more advantageous for operation at pH about 7 or below.

The reaction can be successfully carried out in an aqueous medium using aqueous hydrogen peroxide as the feed to the system. Especially when using alpha-methylidene alkanals which have a low solubility in water, it is advantageous to employ a mutual solvent for the reactants instead of or together with water. Water-soluble alcohols are useful mutual solvents, especially the less reactive tertiary alcohols such, for instance, as tertiary butyl alcohol and the like, although other alcohols such as methanol, ethanol, isopropanol, isobutyl alcohol, allyl alcohol, methallyl alcohol, etc. can also be used. Polyhydric alcohols, for instance, ethylene glycol, 2-methyl-2,4-pentanediol, etc. can be similarly used, as can other non-acidic solvents such as ketones, ethers, esters and the like, for example, acetone, methyl ethyl ketone, cyclohexanone, diacetone alcohol, dimethyl ether, ethylene glycol monomethyl ether, ethylene glycol monoacetate, etc.

Undesirable side reactionss, especially formation of acids, are reduced by using a diluent such as water and/or one or more of the foregoing mutual solvents to reduce the concentration of the reactants in the mixture. Concentrations of reactants of not more than 50% by weight of the mixture are preferred and more preferably concentrations not greater than 30% are used. Most preferably the reaction is conducted with amounts of liquid diluent such that the concentration of epoxyaldehyde product in the mixture on completion of the reaction is between about 5% and about 15% by weight of the reaction mixture.

The reaction is exothermic and relatively rapid. The temperature of operation is not highly critical. Temperatures in the range of about 0° to about 100° C. can be employed advantageously, although temperatures of the order of about 20° to about 50° C. will usually be preferred. The higher the reaction temperature the shorter the reaction time which should be used for best results. Thus whereas times as long as about 24 hours or more may be used at about 0° C. or lower, less than 5 minutes' reaction time is desirable when the temperature is increased to 100° C. or higher. When using temperatures above the boiling point of one or both reactants it is preferred to operate under sufficient superatmospheric pressure to maintain the reactants at least partly in the liquid phase.

The new reaction can be carried out in a variety of different ways using batch, intermittent or continuous methods of operation. The reactants can be introduced in any convenient order. One method of batchwise reaction which has been found to be advantageous is to feed the alpha-methylidene alkanal in the liquid phase into a solution of hydrogen peroxide in a stirred reactor provided with temperature control means to maintain the desired reaction temperature. Preferably cooling is used with a feed rate adjusted so as to maintain the temperature below about 40° C. It has been found convenient to simultaneously feed a solution of a basic agent into the reaction mixture through a separate feed line at a rate so as to maintain the pH in the mixture within the chosen limits during the reaction. It is feasible, however, to add all of the basic agent to the hydrogen peroxide solution at the start of the reaction in this method of operation by choosing basic agents which do not increase the pH excessively when present in the required amount. Basic acting salts such as sodium bicarbonate, lithium phenoxide, etc. are suitable for maintaining the desired pH in this way. Alternatively one can charge only a portion, say about 5% to about 15% of the hydrogen peroxide to the reactor initially and then feed in alpha-methylidene alkanal and hydrogen peroxide, separately in approximately stoichiometric proportions while maintaining the required pH as previously indicated until a reactor charge has been completed. This modified batch operation has the advantage of reducing the amount of acidic by-product formed as a result the lower average concentration of the reactants in the mixture which is thus obtained.

The process can be carried out continuously in apparatus of the foregoing type, for example, by partially reacting an initial charge of hydrogen peroxide as described above, then continuously adding alpha-methylidene alkanal and a stream of hydrogen peroxide separately to the reactor with continuous or intermittent addition of base in the required amount while continuously or intermittently withdrawing epoxypropionaldehyde-containing reacted mixture from the reactor. The same result can be obtained, usually more advantageously, by using as the reactor a cooler with or without a time tank in series therewith and employing a pump to circulate reaction mixture therethrough as a continuously circulating stream into which alpha-methylidene alkanal, hydrogen peroxide and basic agent are continuously fed at separate points sufficiently separated from the point of withdrawal of reaction mixture that substantial reaction is achieved before removal of the product-containing mixture from the reactor. Alternatively the alpha-methylidene alkanal can be fed at spaced points along the path of flow of the reaction mixture through a tubular or other suitable form of reactor in which the proper temperature is maintained. Temperature control can be achieved by external cooling or evaporation of a volatile component of the mixture, for instance, a liquefied gaseous hydrocarbon such as butane or isopentane and the pressure on the system regulated so that it will evaporate at the chosen reaction temperature.

The epoxypropionaldehyde produced can be recovered from the reaction mixture in any suitable manner, account being taken of the reactive nature of these compounds, especially the tendency of the epoxide ring to undergo hydration in aqueous media, slowly under neutral conditions and more rapidly under acidic or basic conditions. On completion of the reaction the mixture will contain, when using the previously indicated preferred proportions of reactants, in addition to the epoxypropionaldehyde product, a small amount of excess alphamethylidene alkanal or hydrogen peroxide, water formed in the epoxidation reaction in the amount of one mole per mole of epoxypropionaldehyde produced, water and/or alcohol or other solvent added with the feed, salts produced from reaction of the acid by-products formed in the reaction with the basic agent used, with or without a small excess of such base. A small amount of polymerization inhibitor or mixture of inhibitors, such as hydroquinone, ditertiary butyl-para-cresol, catechol, and substituted para-phenylenediamines, e.g. N,N'-dimethyl-para-phenylenediamine, will usually also be present in the mixture since it is preferred to add such inhibitor with the alpha-methylidene alkanal feed in order to minimize its polymerization prior to reaction. Small amounts of hydrogen peroxide stabilizers will also usually be components of the reacted mixture. These include such compounds as magnesium silicate, sodium stannate, potassium pyrophosphate, and other known peroxide stabilizers which are usual components of commercial hydrogen peroxide or which, together with other stabilizers as, for instance, alkaline earth metal salts such as magnesium sulfate, calcium chloride, etc. which it is often advantageous to add to the reaction mixture in small amounts, e.g. 0.5 to about 5% by weight, whether or not they are also added with the hydrogen peroxide feed. One suitable method of recovering epoxypropionaldehydes from such reaction mixtures is flash distillation under approximately neutral conditions, using reduced pressure, preferably at a temperature below 100° C., more preferably at between about 50° C. and about 60° C. The time of exposure of the epoxyaldehydes to elevated temperatures should be shorter the higher the temperature in order to minimize reactions, particularly hydration of the epoxy group. The flashed epoxypropionaldehydes will be found to be quite stable after this removal from the salts and can be advantageously used as thus recovered in aqueous solution.

Other methods of recovery such as extraction with ether or the like can also be used and where epoxypropionaldehydes are desired as intermediates for further synthesis, it is often advantageous to use epoxidation mixture for this purpose without isolating the epoxypropionaldehydes therefrom. For example, where the epoxypropionaldehydes are to be converted to the corresponding dihydroxy aldehydes by hydration of the epoxy group, it has been found that the hydration can be carried out successfully without flashing off the epoxyaldehydes from the epoxidation mixture. Whether or not epoxypropionaldehydes are separated from the epoxidation mixture, the hydration can be carried out under alkaline, neutral or acid conditions. A substantial excess of water is desirable for the hydration and preferably the reaction is carried out at epoxypropionaldehyde concentrations of about 5 to about 25% by weight. Sufficient water will generally be present in the epoxidation mixture but it may be advantageous to add additional water in some cases. Heating the neutralized epoxidation mixture at 60° C. to 100° C. has been found to be one suitable method. Higher yields are generally obtained, however, by reaction with water under acid conditions, most preferably at a pH of about 0.5 to about 1.0. Although longer reaction times are required it is usually advantageous to carry out the acid hydration at a temperature of about 50° C. or below, most preferably at about room temperature, when using the epoxidation mixture for the reaction since higher yields can be obtained in this way. Under these preferred conditions the hydration can be completed in about 3 to about 24 hours and yields of alpha,beta-dihydroxypropionaldehydes of the order of about 95% or higher can be obtained.

The alpha,beta-dihydroxypropionaldehydes which are obtained as described above are readily hydrogenated to the corresponding polyhydroxyhydrocarbons by reaction with hydrogen in the presence of a hydrogenation catalyst. The hydrogenation can be successfully carried out without separating the dihydroxypropionaldehydes from the reaction mixtures in which they are formed. Liquid phase hydrogenation, for example, at about 50° C. to about 150° C. and a hydrogen pressure of at least 100 p.s.i.g., or more preferably about 750 to 1500 p.s.i.g. using Raney nickel or other active forms of nickel, or copper chromite, ruthenium on charcoal, or the like as catalyst, in amounts of about 1% to about 10% by weight of the alpha,beta-dihydroxypropionaldehyde present is particularly advantageous. The hydrogenation is usually complete in about 1 to about 3 hours under these conditions, affording essentially quantitative conversions of the starting dihydroxypropionaldehydes to the corresponding triols.

This novel combination process whereby alpha-methylidene alkanals can be converted to glycerols by three cooperating steps of epoxidation, hydration of the resulting epoxypropionaldehydes and hydrogenation of the alpha,beta-dihydroxypropionaldehydes thus obtained is a special feature of this invention in one of its aspects. It provides an especially advantageous method of producing glycerine from acrolein, for example, whether or not the intermediates, glycidaldehyde and glyceraldehyde, are separated from the reaction mixtures in which they are produced before carrying out their hydration and hydogenation, respectively. Thus each of the three steps of this combination process gives excellent yields and conversions so that final conversions of acrolein to glycerine between 80 and 90% can be obtained. Expensive catalysts are unnecessary; cheap bases can be used. Minimum consumption of reagents is required for the process, and only relatively simple standard equipment is necessary for large scale plant operation. The capital investment is accordingly small particularly when the process is carried out without distillations for separation of intermediates. These advantages are also realized when the process is applied to the conversion of other alpha-methylidene alkanals to the corresponding triols, but the economies of the new process are particularly important in the case of glycerine production because of the large scale on which it is manufactured and its relatively low price.

The following examples are illustrative of suitable methods of carrying out the new epoxidation and also show suitable methods for operation of the new combination process.

*Example I*

This example illustrates the production of glycidaldehyde by epoxidizing acrolein. To a 1-liter, 5-neck, round-bottom flask equipped with mechanical stirrer dropping funnels, thermometer, and electrodes connected to a Beckman pH Meter, were charged 59.2 grams (0.536 mole) of 30.8% hydrogen peroxide (Mallinckrodt) and 390 ml. of distilled water. The pH of the solution was adjusted to 8.0 by the addition of a few drops of 1 N sodium hydroxide and then 29.5 grams (0.50 mole) of acrolein (95% purity, containing about 5% of acetone and propionaldehyde) was added dropwise with stirring over a one hour period at 25–30° C. The temperature was maintained in the desired range by periodic cooling with an ice bath. The pH was maintained at 8.0±0.2 by the addition of 1 N sodium hydroxide. Following the end of acrolein addition, stirring was continued for an hour (at the same pH) before iodimetric titration for peroxide indicated that 96% of the theoretical amount had been consumed. After one hour longer, a similar titration indicated that 97.7% had been consumed. Titration for alpha-epoxide (hydrogen chloride-magnesium chloride) at that time indicated the presence of 0.439 mole of glycidaldehyde. A blank test for epoxide carried out in the same way with the same amount of excess hydrogen peroxide showed no interference with the test method. The yield of epoxypropionaldehyde was thus 87.8% based on the acrolein charged. Acidic by-product (mainly acrylic acid) amounted to 0.041 mole or 8.2% based on acrolein charged.

Example II

In a similar operation with a higher concentration of reactants, 3 moles of acrolein were added to 3.15 moles of 30.8% hydrogen peroxide diluted with only 900 ml. of water. After one hour following the end of the acrolein addition, titration for epoxide showed that the yield of glycidaldehyde was 83% based on acrolein charged. Acidic by-product amounted to 12.2%.

Example III

In another operation employing a further increase in concentration of reactants, 2 moles of acrolein were added to 2.10 moles of 30.8% hydrogen peroxide diluted with 100 ml. of water. The pH was maintained at about 8.2 by the addition of 2 N sodium hydroxide. The addition of acrolein at 20–25° C. required 1¾ hours, during which time a 23% conversion to acidic product was observed. After another hour at the same temperature and pH, the total consumption of alkali amounted to 0.51 mole. The yield of glycidaldehyde in this run was 70%.

Example IV

When a pH of 9.8–10.1 was maintained using the method of Example II and similar conditions of concentration and temperature, the yield of glycidaldehyde was 61% and the by-product acid amounted to 31%.

Example V

Using the method of addition of Example II and similar reaction conditions except for temperature, which was maintained between 40° C. and 50° C., and pH which was 6.5±0.3 throughout the reaction, 97% of the theoretical amount of hydrogen peroxide was consumed in a 2½ hour reaction period and the yield of glycidaldehyde was 79%. The by-product acid formation amounted to 13%.

Example VI

The reverse order of adding the reactants is illustrated by the following test run. To a 1-liter kettle (equipped as previously described in Example I) was charged 400 ml. of distilled water and 1.20 moles of acrolein. To the stirred mixture held at 35–40° C. were added dropwise 1.00 mole of 30.5% hydrogen peroxide and 1.0 N sodium hydroxide to maintain the pH at 6.5–7.0.

After an addition period of one hour followed by continued reaction at 35–40° C. for another 45 minutes there was obtained a 90% conversion of charged peroxide to give glycidaldehyde in 91% yield (based on peroxide converted) along with 0.035 mole of acidic by-product.

Example VII

In this example acrolein was epoxidized by premixing the reactants and adding basic agent intermittently during the course of the reaction. A mixture of 1.0 mole of acrolein, 0.70 mole of hydrogen peroxide added as a 30.5% aqueous solution, and 300 ml. of water was made up in the apparatus of Example I. While keeping the temperature at 35–40° C., 1 N sodium hydroxide was added as required to maintain the pH in the range of 6 to 7. In 2½ hours' reaction time there was obtained an 84% yield of glycidaldehyde based on the hydrogen peroxide applied and a 6% yield of acidic by-products.

Example VIII

When the epoxidation was carried out as in Example II using a strongly basic amine-type ion exchange resin (Rohm and Haas IRA-400) in place of sodium hydroxide there was obtained a 59% conversion of acrolein to glycidaldehyde.

Example IX

This example illustrates the use of sodium bicarbonate as the basic agent in the epoxidation.

0.20 equivalent of 1 N sodium bicarbonate solution was added in one portion to 1.05 moles of 30.5% hydrogen peroxide diluted with water in the proportions of Example II using the reactor of Example I. One mole of acrolein was then introduced over a period of 5 minutes and the reaction continued for about half an hour while the temperature was kept at 40°–50° C. The pH of the mixture remained constant at 7.4 throughout the acrolein addition. The yield of glycidaldehyde was 82% of the theoretical, 94% of the hydrogen peroxide being consumed in the process.

When ammonium hydroxide was used in place of sodium hydroxide and the reaction carried out at 30°–35° C. using a dilution comparable to that of Example II, there was obtained a 54% conversion of acrolein to glycidaldehyde. The consumption of ammonium hydroxide was about 0.4 mole per mole of charged acrolein.

Example X

The following table summarizes the approximate rates at which glycidaldehyde is formed during the first hour of reaction from an equimolar mixture of acrolein and hydrogen peroxide diluted with 300 ml. of water per mole of acrolein and reacted at 30°–35° C. under varying acidic pH conditions maintained by adding 1 N sodium hydroxide solution to the reaction mixture intermittently during the reaction:

| pH Range | Conversion of Acrolein to Glycidaldehyde (Mole Percent per Hour) |
|---|---|
| 4.4–4.7 | 1.4 |
| 5.0–5.3 | 1.8 |
| 5.3–5.6 | 6.6 |
| 6.0–6.5 | 7.5 |
| 6.5–7.0 | 23.7 |

Example XI

The crude reaction mixture from Example II above (1770 ml., 2.49 moles of glycidaldehyde) was flashed in a circulating evaporator [Ind. Eng. Chem., Analytical Edition, vol. 16, page 754 (1944)] at 45°–50° C. and 60 mm. pressure using a wet ice trap and a Dry Ice trap in series beyond the condenser to protect the vacuum pump. In about one hour residence time the mixture was concentrated to about 200 ml. volume. At that point, an additional 200 ml. of water was added to the bottoms, and flashing was continued until the bottoms again amounted to about 200 ml. There was taken overhead 1730 grams (including a small amount collected in the wet ice trap) of water-white distillate which contained 1.92 moles of glycidaldehyde by titration for alpha-epoxide. The recovery by flashing was thus 77% of that charged. The acidity value on the distillate was 0.0004 equivalent/100 grams, corresponding to 0.007 mole of acid total. The Dry Ice trap contained 4 grams of material which was liquid at −80° C.; it evaporated on standing for a short while at room temperature and was probably mainly acetone and propionaldehyde from the 95% acrolein. That the product thus recovered was glycidaldehyde was confirmed by converting it to glyceraldehyde by hydration as described in the following experiment.

Example XII

A solution of 1.00 mole of flashed glycidaldehyde contained in 902 grams of distillate from Example XI above was treated with 100 ml. of 0.988 N sulfuric acid and allowed to stand at room temperature. After 18 hours, 95% of the epoxide had disappeared, and the solution was allowed to stand an additional 21 hours before the sulfuric acid was neutralized with excess barium carbonate (15 grams). The barium salts were then filtered and washed with water. A carbonyl value on the filtrate indicated the presence of 1.07 moles of carbonylic product, while a titration for glyceraldehyde (periodate-acidimetric) showed 1.00 mole to be present, corresponding to quantitative yield of glyceraldehyde based on the glycidaldehyde used.

Glyceraldehyde, M.P. 132°–134° C., was isolated from a barium carbonate treated hydrolysis solution, prepared as described above, by vacuum concentration of the filtrate to a thick syrup. The syrup slowly crystallized over a period of several days. The mixed melting point with an authentic sample of dl-glyceraldehyde (M.P. 138–9° C.) was 134°–137° C.

*Example XIII*

The glyceraldehyde solution of Example XI above was charged to a 1450 ml. autoclave along with one rounded teaspoonful of Raney nickel (freshly washed) and hydrogenated at 1000 p.s.i.g. and 100° C. maximum temperature. Hydrogenation started at room temperature and was essentially complete by the time the temperature had reached 80° C. The temperature was held at 100° C. for an hour to insure complete hydrogenation. The theoretical amount of hydrogen was absorbed.

After cooling to room temperature and venting, the Raney nickel was removed by filtration. Analysis of the filtrate for glycerol (periodate-acidimetric) indicated the presence of 0.95 mole of glycerol. This represents a 95% yield based on glycidaldehyde.

Concentration and Claisen distillation afforded a 92% yield (based on flashed glycidaldehyde) of glycerol of 98.1% purity, B.P. 124–6° C. (<1 mm.).

*Example XIV*

Acrolein was epoxidized by batchwise reaction with hydrogen peroxide using 1.03 moles of hydrogen peroxide per mole of acrolein at about 30°–35° C. and a pH of 8 maintained by adding 1 N sodium hydroxide solution intermittently during the reaction. Titration of a sample for epoxide showed an 86% yield of glycidaldehyde. The consumption of base was 0.07 mole per mole of acrolein charged. Unreacted peroxide in the reaction mixture was decomposed catalytically with manganese dioxide and the mixture acidified to pH 0.8 and held overnight at room temperature. The reaction mixture was then neutralized with sodium hydroxide, Raney nickel catalyst was added and the mixture heated under hydrogen pressure at 85° C. for one hour and then at 170° C. for an additional hour to insure completion of the hydrogenation. Analysis of the aqueous solution indicated an 89.3% yield of glycerol based on epoxide.

The dilute aqueous glycerol was concentrated to low volume and heated with an excess of sodium hydroxide for two hours at 100° C. After neutralization to pH 7, the solution was desalted by dilution with ethanol and Claisen distilled at <1 mm. Glycerol of 94.3% purity (periodate-acidimetric titration) distilled at 125° C. The yield of pure distilled glycerol was 82% based on glycidaldehyde or 69% based on the original acrolein charged.

*Example XV*

Substitution of methacrolein for acrolein in Example II resulted in a 70% conversion to epoxyisobutyraldehyde and a 7% conversion to acidic product, mainly methacrylic acid.

Hydration of the epoxyisobutyraldehyde and hydrogenation as described in Example XIII gives beta-methyl glycerol (B.P. 120°–122° C. at 3 mm.) in the same way.

*Example XVI*

To demonstrate the effectiveness of salts of phenols as pH control agents in the process, acrolein was epoxidized with hydrogen peroxide and added sodium phenate in an ice-cooled one-liter reactor equipped with a stirrer, condenser, thermometer, pH electrodes and two dropping funnels.

The reactor was charged with 300 ml. of water and 0.55 mole of 30% hydrogen peroxide solution. While stirring at 35° to 40° C., half a mole of acrolein was added over a period of 15 minutes. The pH of the reaction mixture was maintained at 8.0 to 8.3 throughout the reaction by adding a solution of 11.6 grams (0.10 mole) of sodium phenate in 100 ml. water. On completion of the acrolein addition, the reaction mixture was stirred an additional ten minutes at 40° C. Analysis of the reacted mixture showed production of 0.37 mole of glycidaldehyde representing a yield of 74% based on the acrolein charged and 96% of the theoretical consumption of hydrogen peroxide.

It will be understood that the above examples are merely illustrative and that the present invention broadly comprises contacting an alpha-methylidene alkanal with hydrogen peroxide and a basic agent, whereby epoxidation of said aldehyde is effected and an alpha, beta-epoxypropionaldehyde containing the same number and arrangement of carbon atoms as the starting alpha-methylidene alkanal is obtained as primary product of the process. Specific alpha-methylidene alkanals, other than those used in the examples, well adapted for use in the process, include alpha-ethylacrolein, alpha-hexyl-acrolein, and alpha-isopropylacrolein. In general the most favorable yields and conversions are obtained with the alpha-methylidene alkanals of 3 to 9 carbon atoms per molecule.

It will thus be seen that the invention offers many advantages and is capable of considerable variation not only with respect to the alpha-methylidene alkanals which can be epoxidized and the glycerol or alpha-alkyl glycerols which can be produced thereby but also with regard to the procedure for carrying out the reaction. It will, therefore, be understood that the invention is not limited to the details of operation or examples used for illustration nor is the invention limited by any theory proposed in explanation of the new and improved results which are obtained.

This application is a continuation-in-part of application Serial No. 588,988 filed June 4, 1956, but now abandoned.

I claim as my invention:

1. A process which comprises reacting an alpha-methylidene alkanal of 3 to 9 carbon atoms per molecule of the formula

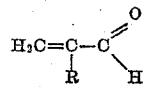

wherein R represents a member of the group consisting of hydrogen and alkyl with hydrogen peroxide in the liquid phase at about 0° to about 100° C. in the proportions of about 0.5 to about 1.5 moles of hydrogen peroxide per mol of alpha-methylidene alkanal while maintaining the pH of the mixture at least 4 but no higher than 12 throughout the reaction using a time not substantially greater than about 24 hours which is shorter the higher the temperature whereby an alpha,beta-epoxypropionaldehyde corresponding to said alpha-methylidene alkanal is produced, said alpha-methylidene alkanal and hydrogen peroxide being essentially the sole reactants in said reaction.

2. A process in accordance with claim 1 wherein the reaction is carried out in an aqueous medium at a temperature of about 20° C. to about 50° C.

3. A process in accordance with claim 2 wherein the reaction is conducted with an amount of liquid diluent inert under the reaction conditions such that the concentration of epoxyaldehyde product in the mixture on completion of the reaction is between about 5% and about 15% by weight of the mixture.

4. A process in accordance with claim 1 wherein the pH is maintained between 4 and 10 by adding sodium hydroxide.

5. A process in accordance with claim 1 wherein a mole ratio of hydrogen peroxide to alpha-methylidene alkanal of about 0.8:1 to about 1:1 is used with a pH not higher than about 7.

6. A process in accordance with claim 1 wherein free hydrogen peroxide is maintained in the reaction mixture when operating at a pH above 7 but not higher than 12.

7. A process in accordance with claim 1 wherein methacrolein is reacted to produce alpha,beta-epoxyisobutyraldehyde.

8. A process which comprises epoxidizing an alpha-methylidene alkanal in accordance with claim 1, intimately mixing the alpha,beta-epoxypropionaldehyde corresponding thereto which is thus produced with an excess of water under epoxide hydration conditions to form the corresponding alpha,beta-dihydroxypropionaldehyde and hydrogenating said dihydroxypropionaldehyde at about 50° to about 150° C. with hydrogen under a pressure of at least 100 p.s.i.g. in the presence of a hydrogenation catalyst to convert the aldehyde group to a carbinol group.

9. A process which comprises reacting acrolein with hydrogen peroxide in the liquid phase at about 0° to about 100° C. in the proportions of about 0.5 to about 1.5 moles of hydrogen peroxide per mole of alpha-methylidene alkanal while maintaining the pH of the mixture at least 4 but not higher than about 10 throughout the reaction, using a time not substantially greater than about 24 hours, which is shorter the higher the temperature whereby glycidaldehyde is produced, acrolein and hydrogen peroxide being the sole reactants in said reaction.

10. A process in accordance with claim 9 wherein an excess of acrolein to hydrogen peroxide is used in the reaction and the pH is maintained below about 7.

11. A process in accordance with claim 9 wherein an excess of hydrogen peroxide to acrolein is used in the reaction and the pH is maintained between 7 and about 10.

12. A process in accordance with claim 9 wherein the reaction is carried out in an aqueous medium at a temperature of about 20° to about 50° C. using an amount of water such that the concentration of glycidaldehyde in the mixture on completion of the reaction is between about 5% and about 15% by weight of the mixture.

13. A process in accordance with claim 12 wherein sodium hydroxide is added to the reaction mixture and the pH is about 6.5 to about 8.5.

References Cited in the file of this patent
UNITED STATES PATENTS 2,833,787   Carlson _____ May 6, 1958

OTHER REFERENCES

Fieser: Organic Chemistry (1956) page 214.